(12) United States Patent
Stallmann

(10) Patent No.: US 10,233,795 B2
(45) Date of Patent: Mar. 19, 2019

(54) BYPASS VALVE FOR PRESSURE OSCILLATION CONTROL

(71) Applicant: Schaeffler Technologies AG & Co. KG, Herzogenaurach (DE)

(72) Inventor: John Stallmann, Washington, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 75 days.

(21) Appl. No.: 15/433,450

(22) Filed: Feb. 15, 2017

(65) Prior Publication Data

US 2018/0230867 A1    Aug. 16, 2018

(51) Int. Cl.
  *F01L 9/02*   (2006.01)
  *F02D 13/02*  (2006.01)
  *F01L 1/344*  (2006.01)

(52) U.S. Cl.
  CPC .............. *F01L 9/025* (2013.01); *F01L 9/02* (2013.01); *F02D 13/0253* (2013.01); *F01L 2001/34446* (2013.01)

(58) Field of Classification Search
  CPC ... F01L 9/025; F01L 2001/34446; F01L 9/02; F02D 13/0253
  See application file for complete search history.

(56) References Cited

U.S. PATENT DOCUMENTS

| | | | |
|---|---|---|---|
| 4,219,109 A | 8/1980 | Ushijima et al. | |
| 4,982,706 A * | 1/1991 | Rembold | F01L 9/025 123/90.12 |
| 5,152,258 A * | 10/1992 | D'Alfonso | F01L 9/021 123/90.12 |
| 5,165,369 A * | 11/1992 | Rembold | F01L 9/025 123/90.12 |
| 6,257,183 B1 | 7/2001 | Vorih et al. | |
| 2003/0005898 A1* | 1/2003 | Gianolio | F01L 1/08 123/90.13 |
| 2010/0192881 A1* | 8/2010 | Padroni | F01L 9/025 123/90.15 |
| 2011/0277712 A1* | 11/2011 | Haas | F01L 9/025 123/90.12 |

* cited by examiner

*Primary Examiner* — Mark A Laurenzi
*Assistant Examiner* — Wesley G Harris
(74) *Attorney, Agent, or Firm* — Volpe and Koenig, P.C.

(57) ABSTRACT

A hydraulic fluid system for a variable valve train system is provided that allows hydraulic fluid flow from a high pressure chamber to a medium pressure chamber during a higher pressure phase after a control valve closes. The hydraulic fluid system includes a housing defining (a) the middle pressure chamber which is connected to a hydraulic fluid supply, and (b) the high pressure chamber which contains hydraulic fluid that is pressurized by a pump piston assembly configured to engage a rotating cam. A control valve selectively provides a first flowpath for hydraulic fluid between the middle pressure chamber and the high pressure chamber. A bypass valve selectively provides a second flowpath for hydraulic fluid between the middle pressure chamber and the high pressure chamber based on a pressure of the hydraulic fluid in the high pressure chamber.

13 Claims, 2 Drawing Sheets

BYPASS VALVE FOR PRESSURE OSCILLATION CONTROL

FIELD OF INVENTION

This invention is generally related to a variable valve train system, and is more particularly related to a bypass valve for a variable valve train system.

BACKGROUND

Some engines include a variable valve train module which controls valve lift through hydraulic fluid operation. The UniAir® system which is available from Schaeffler Technologies, the assignee of the present invention, is an example of such a variable valve train system and includes a housing for hydraulic components which allows for full control over the lift profile of an associated engine valve. The housing includes various spaces for components and cavities for hydraulic fluid which together control valve timing. Hydraulic fluid systems provide fully variable valve lift capabilities, which promotes engine efficiency (e.g., through precise variable valve actuation and timing depending on the situation).

During operation of the hydraulic fluid system, a high pressure chamber is periodically pressurized and drained. This allows the hydraulic fluid in the high pressure chamber to be used as a hydraulic pushrod to open the engine valve when needed or as a disconnection which produces zero or limited lift. However, the cyclical pressurizing and depressurizing of the high pressure chamber may produce pressure fluctuations which are severe enough to produce undesirable engine noise. For example, during a late engine valve opening mode of the UniAir® system, pressure oscillation occurs in the high pressure chamber due to instantaneous closing of a control valve arranged between the high pressure chamber and a middle pressure chamber while a pump piston assembly compresses hydraulic fluid in the high pressure chamber. These pressure oscillations may contribute to noise, vibration, and harshness (NVH) issues, and it would be desirable to reduce the magnitude of these pressure oscillations.

SUMMARY

A hydraulic fluid system for a variable valve train system is provided that allows hydraulic fluid flow from a high pressure chamber to a medium pressure chamber by a flowpath during a higher pressure phase after a control valve closes. The hydraulic fluid system includes a housing defining (a) the middle pressure chamber which is connected to a hydraulic fluid supply, and (b) the high pressure chamber which contains hydraulic fluid that is pressurized by a pump piston assembly configured to engage a rotating cam. A hydraulic lash adjuster assembly is configured to open and close an engine valve based on a pressure of the hydraulic fluid in the high pressure chamber. A control valve is arranged between the middle pressure chamber and the high pressure chamber to selectively provide a first flowpath for hydraulic fluid between the middle pressure chamber and the high pressure chamber. A bypass valve is arranged between the middle pressure chamber and the high pressure chamber to selectively provide a second flowpath for hydraulic fluid between the middle pressure chamber and the high pressure chamber based on a pressure of the hydraulic fluid in the high pressure chamber.

When the control valve is open, the hydraulic fluid in the high pressure chamber is at a first pressure such that a biasing element urges a spool of the bypass valve to a first position in which the second flowpath is open. When the control valve is closed, and the hydraulic fluid pressure rises in the high pressure chamber, the spool of the bypass valve moves through some stroke reducing the secondary bypass until the second flowpath is closed.

Preferred arrangements with one or more features of the invention are described below and in the claims.

BRIEF DESCRIPTION OF THE DRAWINGS

The foregoing summary as well as the following detailed description will be best understood when read in conjunction with the appended drawings. In the drawings.

DETAILED DESCRIPTION OF THE PREFERRED EMBODIMENTS

Figure 1:
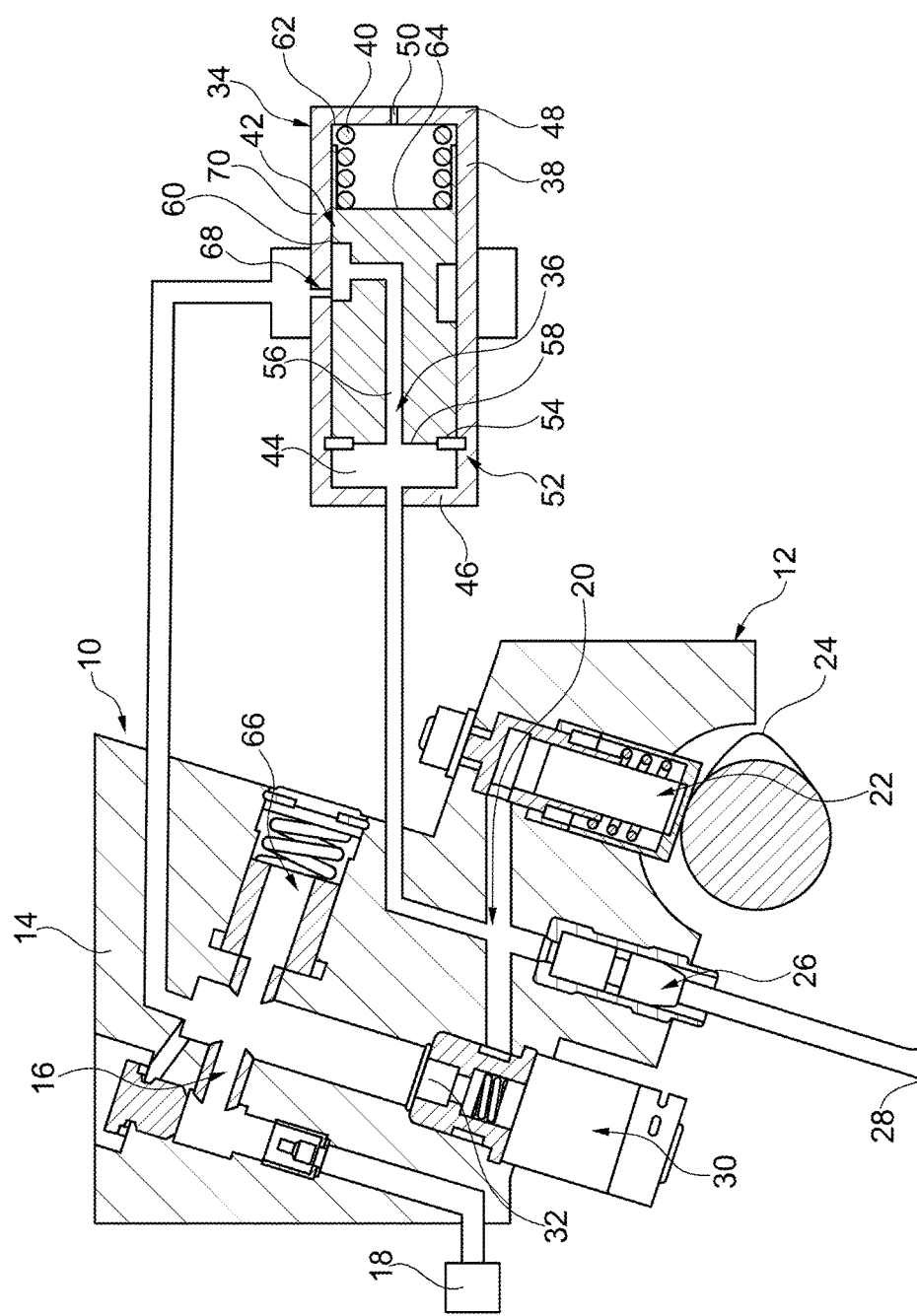
FIG. 1 is a cross section view of a hydraulic fluid system for a variable valve train in a first operating condition.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

Figure 2:
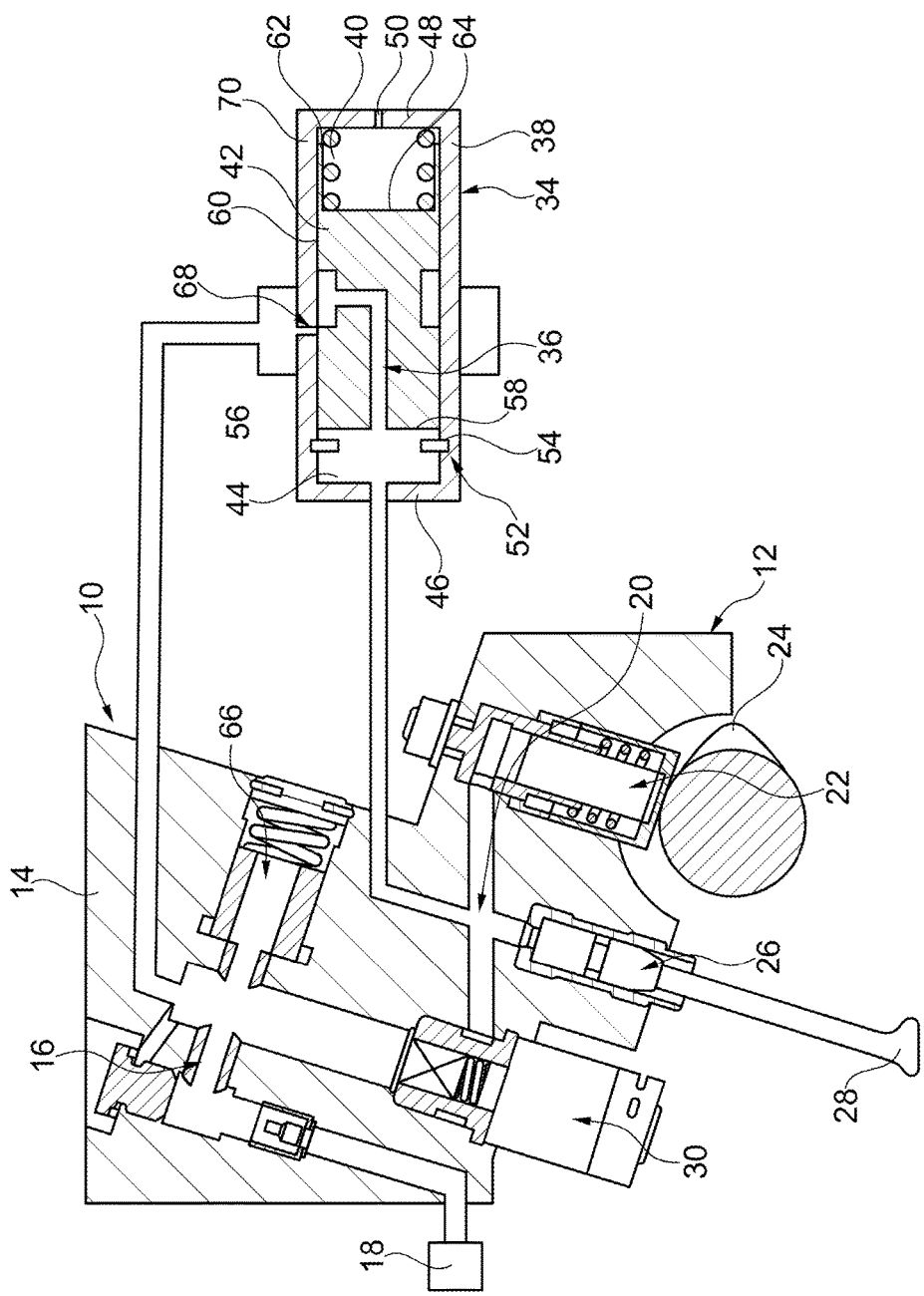
FIG. 2 is a cross section view of a hydraulic fluid system for a variable valve train in a second operating condition.

As shown in FIGS. 1 and 2, a hydraulic fluid system 10 for a variable valve train system 12 is illustrated. The hydraulic fluid system 10 includes a housing 14 defining (a) a middle pressure chamber 16 connected to a hydraulic fluid supply 18 and (b) a high pressure chamber 20 containing hydraulic fluid that is pressurized by a pump piston assembly 22 configured to engage a rotating cam 24. The high pressure chamber 20 is considered the higher pressure chamber due to it including hydraulic pressure that is typically at a greater operating pressure than an operating pressure of the middle pressure chamber 16. Reciprocating motion of the pump piston assembly 22 due to the rotation speed and profile of the rotating cam 24 provides a cyclical pressurization of hydraulic fluid within the high pressure chamber 20. As shown in FIGS. 1 and 2, the middle pressure chamber 16 includes a pressure accumulator 66.

A hydraulic lash adjuster assembly 26 is configured to open and close an engine valve 28 based on pressure of the hydraulic fluid in the high pressure chamber 20. Accordingly, a lift profile of the associated engine valve 28 is controlled by the pressure of the hydraulic fluid within the high pressure chamber 20. The variably controllable input to the engine valve 28 provides more precise and controlled lift profiles for the engine valve 28, which promotes efficient operation of the vehicle engine. Although not specifically illustrated, the hydraulic lash adjuster assembly 26 can include a brake unit to prevent damage caused by quick movements of the engine valve 28 and the hydraulic lash adjuster assembly 26 components.

A control valve 30 is arranged between the middle pressure chamber 16 and the high pressure chamber 20 to selectively provide a first flowpath 32 for hydraulic fluid between the middle pressure chamber 16 and the high pressure chamber 20. When the control valve 30 is open, a free flow of hydraulic fluid between the high pressure chamber 20 and the middle pressure chamber 16 is possible. In this operating state, the pressure in the high pressure chamber 20 is relatively low. When the control valve 30 is closed, the high pressure chamber 20 is closed off from the middle pressure chamber 16, thereby allowing pressure to build in the high pressure chamber 20. In this operating state, hydraulic fluid in the high pressure chamber 20 essentially acts as a hydraulically-rigid pushrod that causes the engine valve 28 to move away from an associated valve seat and toward an open position (e.g. by overcoming a biasing force, for example of a valve spring holding the engine valve 28 against its seat). The control valve 30 is typically a solenoid valve, but can include any type of configuration capable of carrying out rapid opening and closing of an associated valve.

When the control valve 30 is re-opened, hydraulic fluid displaced by the pump piston assembly 22 is directed to the middle pressure chamber 16 (and its pressure accumulator 66), thereby lowering the pressure of hydraulic fluid in the high pressure chamber 20. De-pressurization of the high pressure chamber 20 causes the engine valve 28 to move towards the closed position (e.g., the biasing force of an associated spring engaging the engine valve 20 overcomes a reduced force due to lower pressure hydraulic fluid in the high pressure chamber 20). Accordingly, based on the timing of the opening and closing of the control valve 30, different lift properties can be achieved.

The sudden opening and closing of the control valve 30 causes spikes in the pressure level of hydraulic fluid in the high pressure chamber 20. These pressure spikes may result in undesirable NVH issues. To alleviate these potential NVH issues, a bypass valve 34 is arranged between the middle pressure chamber 16 and the high pressure chamber 20 to selectively provide a second flowpath 36 for hydraulic fluid between the middle pressure chamber 16 and the high pressure chamber 20 based on a pressure of the hydraulic fluid in the high pressure chamber 20. The bypass valve 34 preferably includes a valve housing 38 with a biasing element 40 and a displaceable spool 42 arranged therein. The second flowpath 36 is restricted compared to the first flowpath 32, i.e. the second flowpath 36 has a smaller area than the first flow path 32. As shown in FIGS. 1 and 2, the second flowpath 36 is partially defined through the spool 42. Preferably, the second flowpath 36 is partially defined by an opening 56 extending between a first axial end 58 of the spool 42 and a radial outer surface 60 of the spool 42.

As shown in FIG. 1, when the control valve 30 is open, the hydraulic fluid in the high pressure chamber 20 is at a first pressure such that the biasing element 40 urges the spool 42 to a first position in which the second flowpath 36 is open. As shown in FIG. 2, when the control valve 30 is closed (schematically represented by "X"), the hydraulic fluid in the high pressure chamber 20 increases to a second pressure that is greater than the first pressure hydraulic pressure. The second pressure overcomes a biasing force of the biasing element 40, moving the spool 42 to a second position in which the second flowpath 36 is closed. In this way, the bypass valve 34 closes the second flowpath 36, i.e. the bypass flowpath, when an operating or threshold pressure is reached, i.e. when a relatively higher pressure is achieved in the high pressure chamber 20 after the control valve 30 is closed. The bypass valve 34 provides a reliable secondary flowpath 36 between the middle pressure chamber 16 and the high pressure chamber 20 and reduces the rate at which the hydraulic fluid pressure rises within the high pressure chamber 20 which promotes a relatively low impulsive force on the associated engine valve 28 and therefore a smooth pressure transition. The bypass valve 34 can dramatically reduce pressure oscillations in the high pressure chamber 20 as the control valve 30 is moved from the open position to the closed position by providing the second flowpath 36 to the middle pressure chamber 16. The second flowpath 36 effectively reduces the rate at which the pressure rises in the high pressure chamber 20 and therefore minimizes the impulsive force on the system which results in the pressure oscillations.

The spool 42 and the valve housing 38 of the bypass valve 34 define a reservoir 44 for the high pressure chamber 20 at a first end 46 of the valve housing 38 and the biasing element 40 engages a second opposite end 48 of the valve housing 38. The second end 48 of the valve housing 38 preferably includes a vent 50. The valve housing 38 includes a stop 52 arranged between the first end 46 of the valve housing 38 and the second end 48 of the valve housing 38. The stop 52 provides an abutment surface 54 for the spool 42 when the spool 42 is in the first position. A second axial end 62 of the spool 42 includes a seat 64 for receiving the biasing element 40. The valve housing 38 includes an orifice 68 on a radially outer wall 70 connecting the second flowpath 36 to the middle pressure chamber 16. One of ordinary skill in the art would recognize from the present disclosure that the internal components of the bypass valve 34 can be varied, i.e. stiffness of biasing element 40, size of opening 56, etc., as long as the bypass valve 34 provides a pressure-dependent reservoir, and opening and closing of the second flowpath 36 between the middle pressure chamber 16 and the high pressure chamber 20.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

LIST OF REFERENCE NUMBERS hydraulic fluid system 10
variable valve train system 12
housing 14
middle pressure chamber 16
hydraulic fluid supply 18
high pressure chamber 20
pump piston assembly 22
rotating cam 24
hydraulic lash adjuster assembly 26
engine valve 28
control valve 30
first flowpath 32
bypass valve 34
second flowpath 36
valve housing 38 biasing element 40
displaceable spool 42
reservoir 44
first end 46
second end 48
vent 50
stop 52
abutment surface 54
opening 56
first axial end 58
radial outer surface 60
second axial end 62
seat 64
pressure accumulator 66
orifice 68
radially outer wall 70

What is claimed is:

1. A hydraulic fluid system for a variable valve train system, the hydraulic fluid system comprising:
    a housing defining (a) a middle pressure chamber connected to a hydraulic fluid supply and (b) a high pressure chamber containing hydraulic fluid that is pressurized by a pump piston assembly configured to engage a rotating cam;
    a hydraulic lash adjuster assembly configured to open and close an engine valve based on a pressure of the hydraulic fluid in the high pressure chamber;
    a control valve arranged between the middle pressure chamber and the high pressure chamber to selectively provide a first flowpath for hydraulic fluid between the middle pressure chamber and the high pressure chamber; and
    a bypass valve arranged between the middle pressure chamber and the high pressure chamber to selectively provide a second flowpath for hydraulic fluid between the middle pressure chamber and the high pressure chamber based on a pressure of the hydraulic fluid in the high pressure chamber, wherein the second flowpath is restricted compared to the first flowpath.

2. The hydraulic fluid system of claim 1, wherein the bypass valve includes a valve housing with a biasing element and a displaceable spool arranged therein.

3. The hydraulic fluid system of claim 2, wherein (1) when the control valve is open, the hydraulic fluid in the high pressure chamber is at a first pressure such that the biasing element urges the displaceable spool to a first position in which the second flowpath is open, and (2) when the control valve is closed, the hydraulic fluid in the high pressure chamber increases to a second pressure that is greater than the first pressure and the displaceable spool moves to a second position in which the second flowpath is closed.

4. The hydraulic fluid system of claim 2, wherein the displaceable spool and the valve housing of the bypass valve define a reservoir for the high pressure chamber at a first end of the valve housing and the biasing element engages a second opposite end of the valve housing.

5. The hydraulic fluid system of claim 4, wherein the second end of the valve housing includes a vent.

6. The hydraulic fluid system of claim 4, wherein the valve housing includes a stop arranged between the first end of the valve housing and the second end of the valve housing, and the stop provides an abutment surface for the displaceable spool when the displaceable spool is in the first position.

7. The hydraulic fluid system of claim 2, wherein the second flowpath is partially defined through the displaceable spool.

8. The hydraulic fluid system of claim 7, wherein the second flowpath is partially defined by an opening extending between a first axial end of the displaceable spool and a radial outer surface of the displaceable spool.

9. The hydraulic fluid system of claim 8, wherein a second axial end of the displaceable spool includes a seat for receiving the biasing element.

10. The hydraulic fluid system of claim 2, wherein the valve housing includes an orifice on a radially outer wall connecting the second flowpath to the middle pressure chamber.

11. The hydraulic fluid system of claim 1, wherein the middle pressure chamber includes a pressure accumulator.

12. A hydraulic fluid system for a variable valve train system, the hydraulic fluid system comprising:
    a housing defining (a) a middle pressure chamber connected to a hydraulic fluid supply and (b) a high pressure chamber containing hydraulic fluid that is pressurized by a pump piston assembly configured to engage a rotating cam;
    a hydraulic lash adjuster assembly configured to open and close an engine valve based on a pressure of the hydraulic fluid in the high pressure chamber;
    a control valve arranged between the middle pressure chamber and the high pressure chamber to selectively provide a first flowpath for hydraulic fluid between the middle pressure chamber and the high pressure chamber; and
    a bypass valve arranged between the middle pressure chamber and the high pressure chamber to selectively provide a second flowpath for hydraulic fluid between the middle pressure chamber and the high pressure chamber based on a pressure of the hydraulic fluid in the high pressure chamber,
    the bypass valve includes a valve housing with a biasing element and a displaceable spool arranged therein, and
    the displaceable spool and the valve housing of the bypass valve define a reservoir for the high pressure chamber at a first end of the valve housing and the biasing element engages a second opposite end of the valve housing.

13. A hydraulic fluid system for a variable valve train system, the hydraulic fluid system comprising:
    a housing defining (a) a middle pressure chamber connected to a hydraulic fluid supply and (b) a high pressure chamber containing hydraulic fluid that is pressurized by a pump piston assembly configured to engage a rotating cam;
    a hydraulic lash adjuster assembly configured to open and close an engine valve based on a pressure of the hydraulic fluid in the high pressure chamber;
    a control valve arranged between the middle pressure chamber and the high pressure chamber to selectively provide a first flowpath for hydraulic fluid between the middle pressure chamber and the high pressure chamber,
    the first flowpath providing a bi-directional flow of hydraulic fluid either (I) from the high pressure chamber to the middle pressure chamber, or (II) the middle pressure chamber to the high pressure chamber; and,
    a bypass valve arranged between the middle pressure chamber and the high pressure chamber to selectively provide a second flowpath for hydraulic fluid between the middle pressure chamber and the high pressure, the bypass valve is actuated by hydraulic fluid pressure to move from an open position to a closed position.

* * * * *